June 4, 1935.   M. MARIANS   2,003,602
OUTLET BOX
Filed June 22, 1928   2 Sheets-Sheet 1
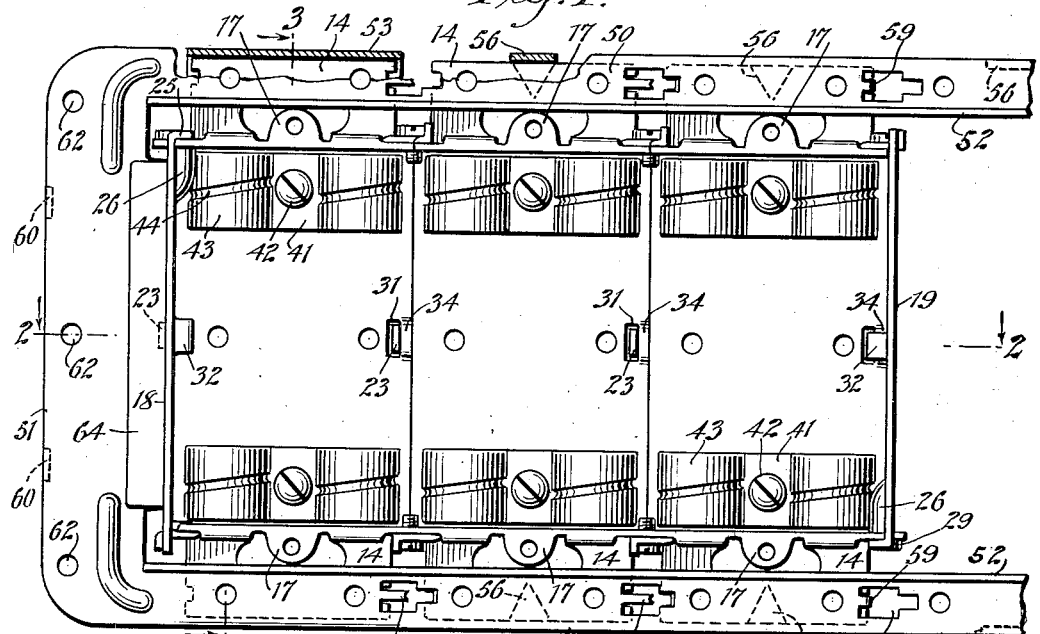
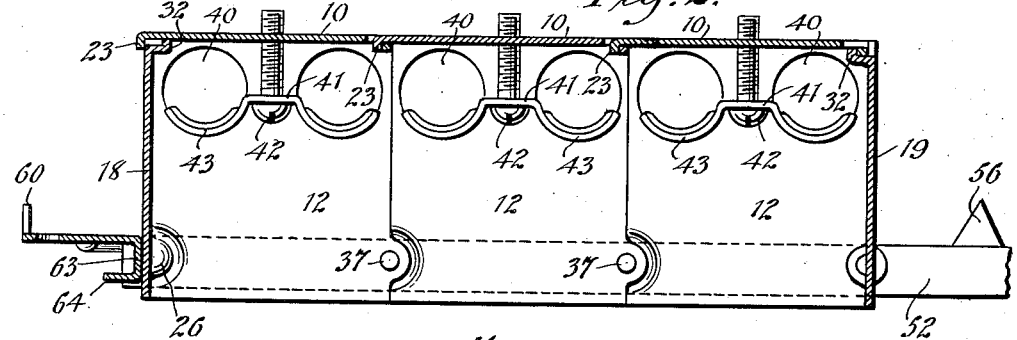
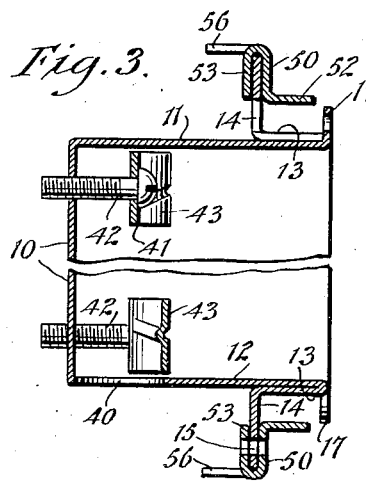
WITNESSES
Edw. Thorpe
Hugh H. Ott
INVENTOR,
Morris Marians
BY
ATTORNEY

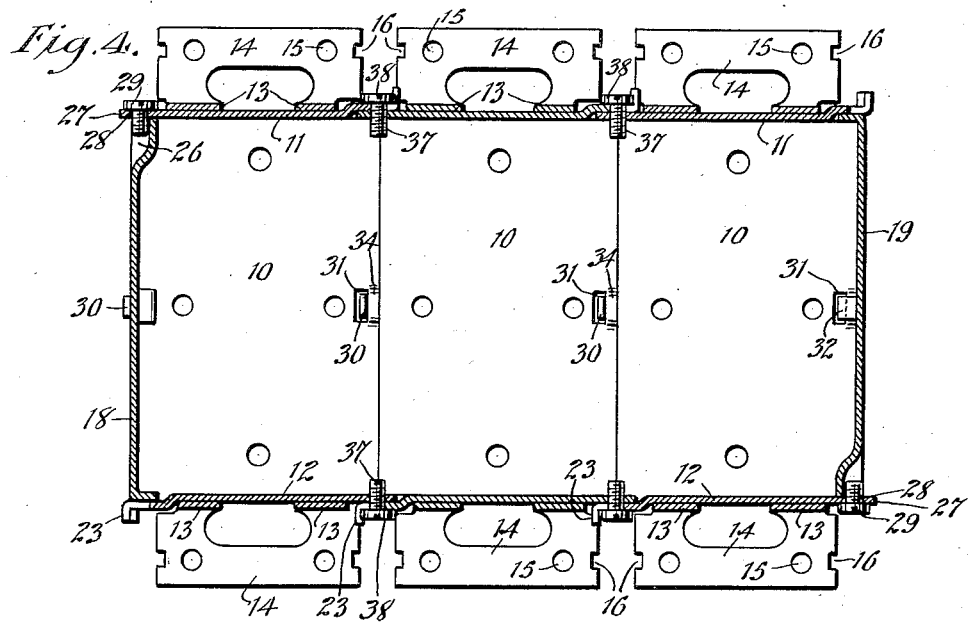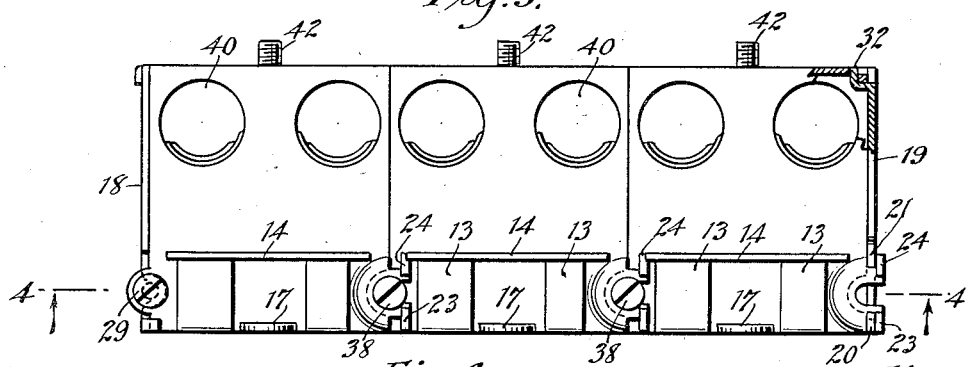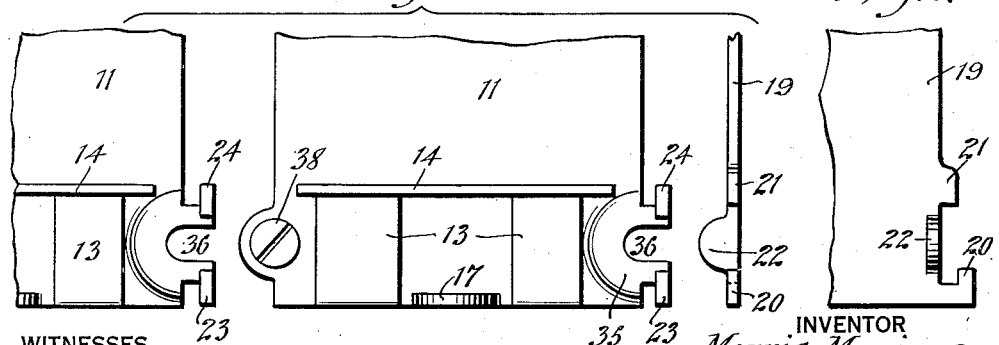

Patented June 4, 1935

2,003,602

UNITED STATES PATENT OFFICE 2,003,602

OUTLET BOX

Morris Marians, New York, N. Y., assignor, by mesne assignments, to Roach Appleton Manufacturing Company, South Bend, Ind., a corporation of Delaware Application June 22, 1928, Serial No. 287,489

8 Claims. (Cl. 247—22)

This invention relates to electrical equipment and installation, and has particular reference to an improvement in outlet boxes and means for supporting the same from the joists or lathing of a building.

In installing outlet boxes, it is necessary to support the same from the joists or lathing, and in some instances a plurality of boxes are supported in side by side relation.

The present invention, therefore, aims for its principal object to provide an improved outlet box and supporting hanger therefor by virtue of which the various installation conditions which are met with, may be readily taken care of by the electrician.

In its broad aspect, the invention comprehends an improved outlet box and a hanger for effectually supporting the same from the joists or lathing of a building, which outlet box and hanger are provided with interengaging means for rigidly assembling one or more boxes with the hanger in an effective and expeditious manner.

More specifically, the invention contemplates an outlet box construction having removable side walls and interengageable means for connecting two or more of the boxes in side by side relation after the side walls of adjacent sides have been removed.

The invention furthermore comprehends an improved outlet box hanger which embodies as a part thereof a lath receiving seat in addition to means which permits anchoring of the same at various points to the joists or lathing.

As a further feature, the invention includes an improved clamp for engagement with the BX cable.

Other features of the invention reside in the comparative simplicity of construction of the hanger and box and the mode of assembly and installation, the economy with which the same may be produced and installed and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a front view of a plurality of outlet boxes and a hanger constructed in accordance with the invention.

Figure 2 is a sectional plan view thereof taken approximately on the line 2—2 of Figure 1.

Figure 3 is a transverse sectional view taken approximately on the line indicated at 3—3 in Figure 1.

Figure 4 is a vertical sectional view through a plurality of connected outlet boxes taken approximately on the line indicated at 4—4 in Figure 5.

Figure 5 is a top plan view of a plurality of connected boxes.

Figure 6 is a fragmentary collective top plan view on an enlarged scale illustrating a plurality of boxes separated and in juxtaposition with the side wall of one box removed.

Figure 7 is an inner face view of a side wall removed.

Referring to the drawings by characters of reference, the improved outlet boxes comprise a body cut, bent and formed from a single sheet of material to provide a rear wall 10 and integral top and bottom walls 11 and 12. From the front edges of the top and bottom walls, rearwardly directed extensions 13 are provided having right angularly projecting attaching flanges or terminals 14 which project respectively upwardly and downwardly from the top and bottom walls 11 and 12 to provide flanges. The flanges or terminals 14 are provided with apertures 15 while their side edges are formed with notches 16, the purpose of which will be hereafter set forth. Between the extensions 13, the forward edges of the top and bottom walls are provided respectively with upwardly projecting and downwardly depending apertured ears 17. In addition to the top and bottom walls, removable and detachable side walls 18 and 19 are provided. The means for detachably connecting the side walls 18 and 19 consists in providing said walls adjacent the forward portion of one side edge with a hooked projection 20 extending in the same plane with said wall and a spaced lug 21. Between the hooked projection and the lug 21, a right angularly projecting ear 22 is provided. The corresponding forward portion of the side edge of the top or bottom wall 11 or 12 is formed with a laterally projecting pair of reversely directed hooked elements 23 and 24, around which element 23 the hooked projection 20 is initially engaged and behind which element 24 the lug 21 is engaged. At the opposite edge adjacent the forward portion, the side walls 18 or 19 are provided with a laterally inwardly offset portion or depression 26. The corresponding edge of the upper or lower wall 18 or 19 is formed with a laterally projecting lug 27 having a threaded aperture 28 for the reception of a screw 29, the shank of which is adapted to engage within the offset depression 26. The side edges of the medial portion of the rear wall are alternately provided with a forwardly directed stud 30 and a keeper slot 31 while the medial portion of the rear edges of the side walls 18 and 19 is provided with an inwardly and rearwardly directed hook 32 and a notch 33. It will also be observed that the edge of the rear wall 10 of the body provided with the keeper slot 31 is offset forwardly as at 32, to permit the rear walls to lie flush with each other when the boxes are hooked together in side by side relation by means of the studs 30 and keeper slots 31. The forward portions of the side edges of the top and bottom walls adjacent the elements 23 and 24 are offset outwardly at 35 and between the elements a notch 36 is defined. The notch 36 is designed to receive the shank 37 of a screw, the head 38 of which is designed to clamp against the offset portion 35 and engage behind the elements 23 and 24 when two boxes are attached in side by side relation, as clearly illustrated in Figure 5 of the drawings. The hook 32 of the side wall 19 is designed to be engaged in the keeper slot 31 of the rear wall of the box body while the forwardly directed stud 30 is designed to engage outside of the medial portion of the side wall 18 adjacent its rear edge. As is customary, the upper and lower walls 11 and 12 are provided with apertures or openings 40 for receiving therethrough the BX cable or other conduit for leading the wiring into the interior of the outlet box. In order to effectually retain the BX cable in place, clamps 41 are provided which are attached to the rear walls 10 by screws 42, the semi-circular clamp wings 43 in the present instance are provided with helically disposed ribs 44 which, in addition to strengthening the clamp wings, are designed to engage between the convolutions of the BX cable to act as a positive retaining means.

The means for supporting one or more of the outlet boxes of the type specified from the joists, studding or lathing of a building consists of a hanger which is preferably constructed from sheet material cut, bent and formed to provide parallel legs 50 which, in service, lie in the same plane and are joined at one end by a bight 51. The legs are provided with forwardly directed flanges 52 on their inner edges while the outer edges adjacent the bight portion are formed with rearwardly and inwardly bent flanges 53, which serve as strengthening flanges, disposed parallel to the legs 50 and extending from the bight portion a distance approximately equal to the width of one of the outlet boxes. This defines a channel shaped portion in each leg for receiving the flanges 14 of one outlet box. The leg 50 and its flange 53 are formed with aligned openings which are designed to be registered with the apertures 15 in the outlet box flanges 14 so as to receive therethrough screws, nails or other fastening devices for anchoring the hanger and outlet box to laths which are disposed directly in rear of the flanges 14 and legs 50. The remaining portion of the outer edges of the legs 50 are formed with integral rearwardly projecting spurs 56 which are designed to be bent around the flanges 14 of the outlet box where more than one box is to be used in the assembly. The portions of the legs which extend beyond the outlet box or boxes are designed to have the spurs driven into the studding or joists to serve in the capacity of anchoring or temporary attaching means while said projecting portions of the legs are designed to have nails, screws or other fastening devices also inserted through the apertures 54. In order to further assist in holding or retaining the box or boxes against accidental displacement, the legs 50 of the hanger are cut out at 58 and are provided with tongues 59 which are designed to be bent rearwardly and laterally to interlock with the notches 16. In practice, where a plurality of boxes are associated, only the tongue which registers with the notch of the inmost box remote from the bight of the hanger is bent, as clearly illustrated in Figure 1. The outer edge of the bight 51 is provided with rearwardly directed anchoring spurs 60 which are designed to be driven into the joists or studding when the hanger is supported from this end. The bight is also provided with perforations 62 for the reception therethrough of nails, screws or other fastening devices to be driven into the joists or studding. The inner edge of the bight is provided with a forwardly directed projection 63 having a laterally and outwardly bent terminal 64 disposed parallel to the bight and combining therewith to provide a lath seat in which a plurality of laths may be seated.

In use, where a plurality of boxes are to be supported by means of the hanger, one box, namely, the left-hand one illustrated in Figure 1, is positioned adjacent the bight 51 with its flanges 14 engaged between the legs 50 and the flanges 53. In this instance, the right hand side wall 19 is removed from said box while both the right and left hand side walls are removed from the intermediate box and the left hand wall removed from the right hand box. The boxes are then assembled by introducing the screw shanks 37 into the notches 36 with the heads 38 thereof disposed behind the elements 23 and 24 and by engaging the forwardly directed studs 30 of the intermediate and right hand boxes in the keeper slots 31 of the left hand and intermediate boxes respectively. The tongues 59 are bent downwardly and laterally to engage in the notches 16 of the flanges 14 of the right hand box and the assemblage is then ready for application to the joists, studding or lathing of the building.

It will thus be seen that an improved outlet box and supporting hanger therefor has been devised, by virtue of which various installation conditions which are met with may be taken care of by the electrician.

What is claimed is:

1. A device of the character described comprising a U-shaped hanger, the legs thereof having folded over portions providing slots opening toward one another, parts of said legs projecting substantially at right angles to the plane of said U-shaped hanger to provide temporary attaching means for temporarily attaching said hanger to an adjacent stud or the like.

2. A device of the character described comprising a hanger having a bight portion and parallel legs extending from said bight portion, said legs having folded over portions providing slots, said legs having tongues adapted to be bent over to provide abutments.

3. A device of the character described comprising a pair of parallel legs, said legs having folded over portions providing slots for the reception of the flanges of an outlet box, a part of said legs being pointed and adapted to be bent into right-angular relationship with said parallel legs to provide temporary attaching means for temporarily attaching said hanger to an adjacent stud or the like.

4. A unitary device of the character described comprising a pair of parallel legs, and a bight portion connecting said legs, said bight portion being formed for attachment to adjacent structure of a building, said legs having folded over portions providing grooves for the reception of the flanges of an outlet box, a part of said legs being formed to provide tongues adapted to provide abutments disposed intermediate of the length of said legs.

5. A device of the character described comprising a pair of parallel legs, said legs having folded over portions providing slots for the reception of the flanges of an outlet box, parts of said legs being in the form of pointed projections adapted to be bent into right-angular relationship with said legs, other parts of said legs being cut out to form abutment lugs disposed intermediate of the length of said legs.

6. A device for assembling and supporting a plurality of outlet boxes comprising a U-shaped hanger, the legs of said hanger being fashioned for attachment to the studding of a building, said legs having co-planar portions and strengthening portions, the outer edges of said legs being provided with bendable spurs adapted selectably to provide temporary fastening means for said hanger or to provide holding means for the flanges of an outlet box.

7. A device for assembling and supporting a plurality of outlet boxes comprising a U-shaped hanger, the legs of said hanger being fashioned for attachment to the studding of a building, said legs having co-planar portions and strengthening portions, the outer edges of said legs being provided with bendable spurs adapted selectably to provide temporary fastening means for said hanger or to provide holding means for the flanges of an outlet box, said legs also being provided with portions providing grooves for the reception of such flanges.

8. A device for assembling and supporting a plurality of outlet boxes comprising a U-shaped hanger, the bight portion of said hanger being provided with a grooved member for receiving the ends of laths, and parallel leg portions extending from said bight portion, said leg portions being provided with reinforcing portions and having at their outer edges folded over portions for the reception of flanges of outlet boxes, certain of said folded over portions being bendable and being of spur-shape whereby to provide temporary attaching means for said hanger.

MORRIS MARIANS.